Feb. 7, 1967  C. GERST  3,302,485
MULTIPLE SPEED FORWARD AND REVERSE TRANSMISSION
Filed March 23, 1964  4 Sheets-Sheet 1

INVENTOR.
CHRIS GERST
BY
ATTORNEYS

United States Patent Office 3,302,485
Patented Feb. 7, 1967

3,302,485
MULTIPLE SPEED FORWARD AND REVERSE TRANSMISSION
Chris Gerst, Detroit, Mich., assignor to Dana Corporation, Toledo, Ohio, a corporation of Virginia
Filed Mar. 23, 1964, Ser. No. 353,703
13 Claims. (Cl. 74—665)

This invention relates to transmissions generally and more particularly to a counterrotating transmission having a pair of output shafts and adapted to provide a plural speed forward and reverse drive for each output shaft; the arrangement being such that each output shaft may be driven independently of the other so that this transmission may be readily adapted for use in tractor type vehicles.

In the embodiment of this invention selected for illustration, the output shafts of the transmission extend therefrom in lateral alignment and may be utilized as the rear or driving axle of a tractor or the like. The input shaft extends axially forward from the transmission and is adapted to be suitably driven by a prime mover. Each of the output shafts is adapted to be coupled to the input shaft by gearing including clutches constructed and arranged so that each of the output shafts will be driven from the input shaft independently of the other in both forward and reverse directions; such gearing including provisions whereby the output shafts may be driven through a number of different gear ratios both in forward and reverse.

It is an object of this invention to provide such a counter-rotating type of transmission which is novel, simple and relatively inexpensive.

Further and other objects of this invention will become apparent when considering the detailed specifications in view of the drawings wherein.

Figure 1:
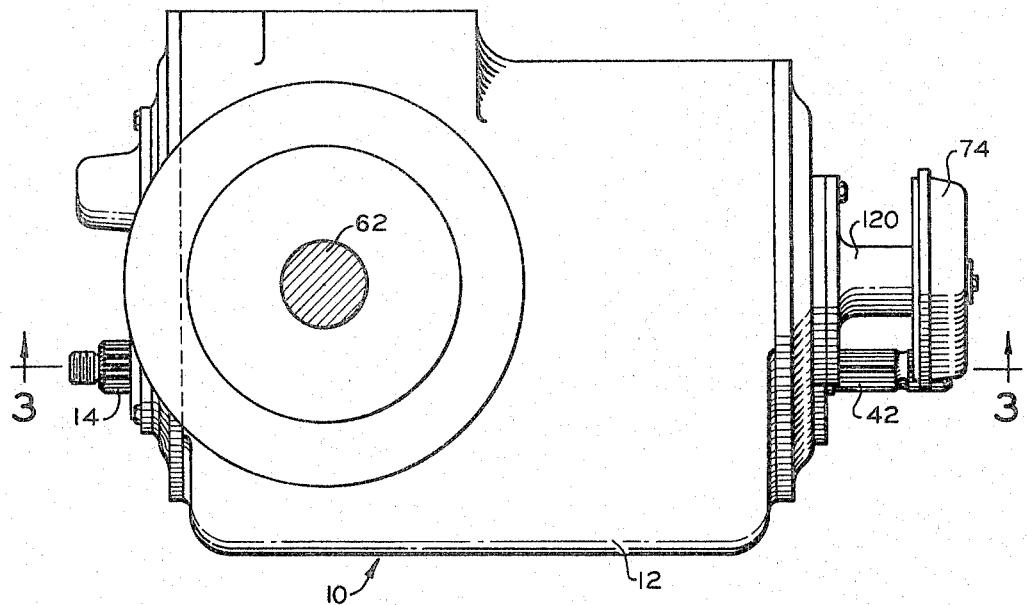
FIG. 1 is a side elevational view of a transmission embodying the invention.
Figure 2:
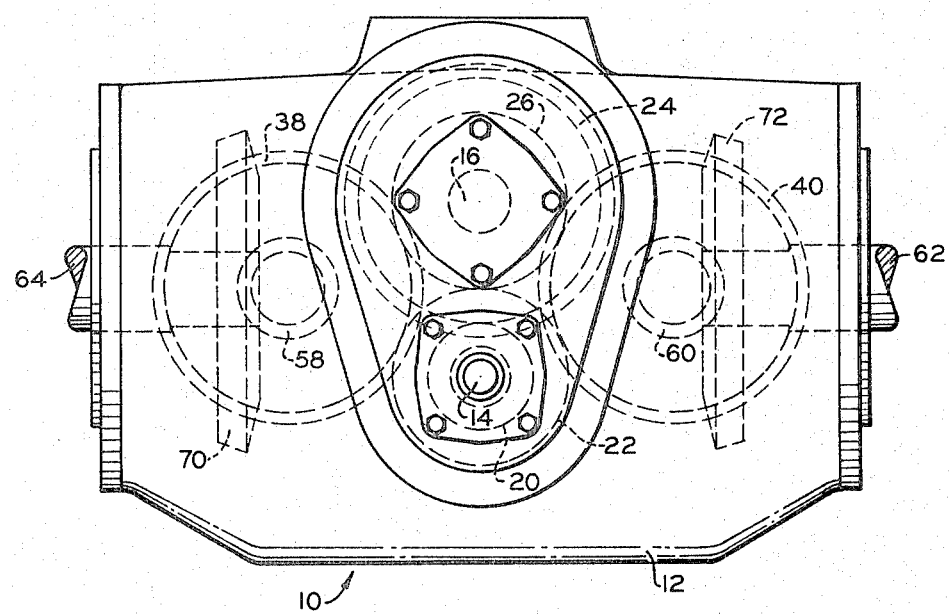
FIG. 2 is an elevational view of the transmission of FIG. 1, viewing the same from the front or input end.

Referring to the drawings, the transmission shown generally at 10 includes a housing 12 made up of a plurality of castings which are suitably secured together to house and form a rigid support for various parts of the transmission and to contain lubricant for the bearings, gears and clutches of the transmission.

The transmission 10 also includes an input shaft 14 which in cooperation with a change speed clutch shaft 16 and the associated gearing form a two-speed gear drive arrangement on the input side of the transmission. The input shaft 14 is rotatably mounted in the case 12 by bearings 13 and has a splined portion 18 extending forwardly from the transmission and adapted to be drivingly connected to a prime mover (not shown), while the portion thereof within the case 12 carries for unitary rotation therewith a pair of axially spaced gears 20 and 22.

Figure 3:
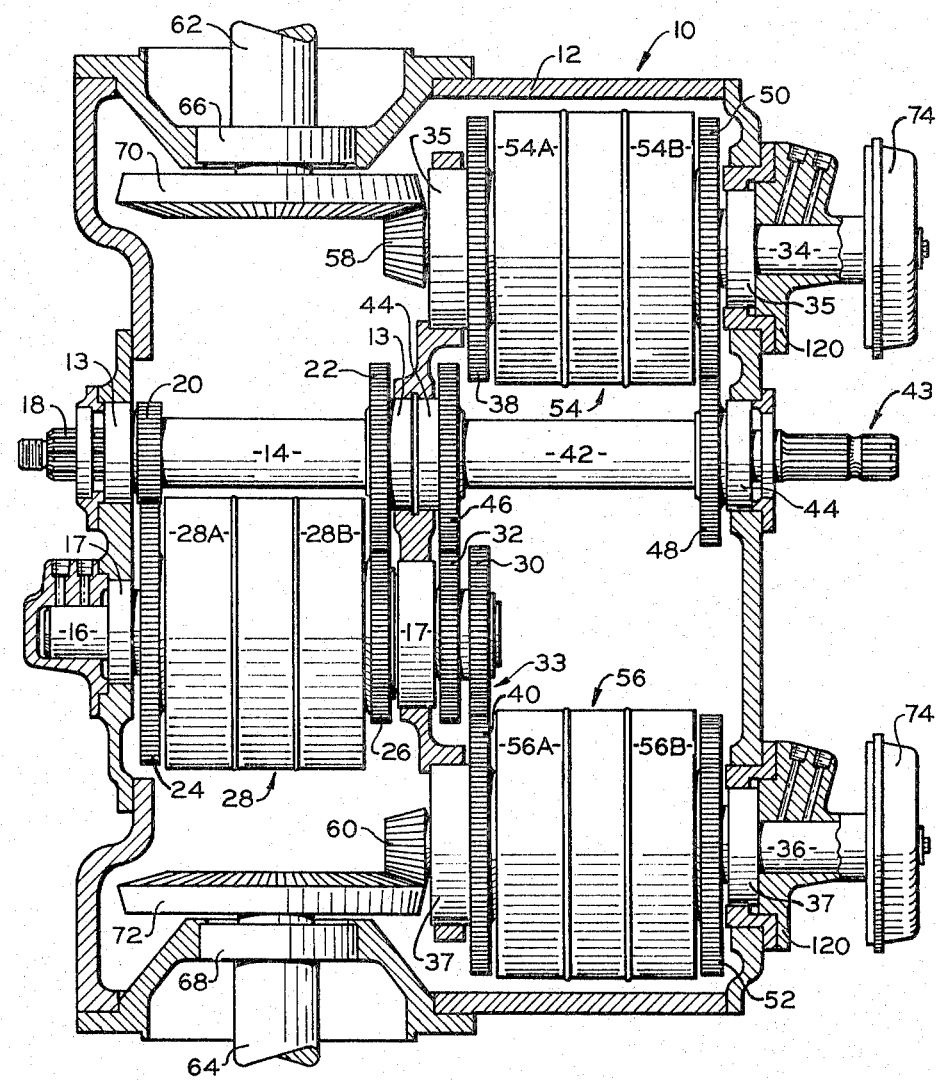
FIG. 3 is a developed fragmentary horizontal sectional view taken generally along the lines 3—3 of FIG. 1.

The change speed clutch shaft 16 is disposed parallel with and vertically above the input shaft 14 and is suitably rotatably mounted in the case 12 by bearings 17. In the developed view shown in FIG. 3, the shafts 14 and 16 are shown in a side by side relationship out of their normal position so as to more clearly show the power train of the transmission 10. A pair of axially spaced gears 24 and 26 are rotatably mounted on the shaft 16, the gear 24 being the low speed gear and continuously meshed with the gear 20, and the gear 26 being the high-speed gear continuously meshed with the gear 22.

Clutch means shown generally at 28, includling a first and second hydraulic pressure actuated clutch 28A and 28B, is carried by the shaft 16 and is operative to alternately clutch the gears 24 and 26 to the shaft 16. The structure of the clutch means 26 will be more fully described hereinafter. Accordingly, when the gear 24 is clutched to the shaft 16 by the clutch 28A, the shaft 16 is driven by the input shaft 14 in the low speed range, while when the gear 26 is clutched to the shaft 16 by the clutch 28B, and the shaft 16 is driven by the input shaft 14 in the high speed range. It is understood that if more speed ratios are desired between the input shaft 14 and the change speed shaft 16, such can be provided by well known means.

The inboard end of the shaft 16 has a pair of identically sized drive gears 30 and 32 secured thereto for unitary rotation therewith, so that in effect the gears 30 and 32 act as a single gear means 33.

A pair of parallel laterally spaced and axially extending clutch shafts 34 and 36 are rotatably mounted in the case 12 by bearings 35 and 37 respectively, and disposed symmetrically relative to the shafts 14 and 16. Rotatably mounted on the forward end of the shafts 34 and 36 are identically sized clutch gears 38 and 40 respectively, which gears are constantly in mesh with the drive gear 30 and, accordingly, are both rotated in the same direction thereby.

An intermediate shaft 42 is rotatably mounted in the case 12 by bearings 44 and is disposed in axial alignment with the input shaft 14. The shaft 42 has a pair of axially spaced gears 46 and 48 mounted thereon for rotation therewith, the gears 46 and 48 being identical in size to the gears 30 and 32. The gear 46 on the forward end of the shaft 42 is constantly in mesh with the drive gear 32 so that the shaft 42 rotates oppositely with respect to the shaft 16. The gear 48 carried by the rear end of the shaft 42 is constantly in mesh with a pair of clutch gears 50 and 52 rotatably mounted on the clutch shafts 34 and 36 respectively so that the gears 50 and 52 are driven in the same direction thereby, this direction being opposite to the direction the clutch gears 38 and 40 are driven. The gears 50 and 52 are the same size as the gears 38 and 40. The rear end of the shaft 42 extends from the case 12 and is splined as shown at 43 and adapted as a source of power for a power-take-off (not shown).

Clutch means shown generally at 54 and 56 are carried by the shaft 34 and 36 respectively; the clutch means 54 comprising a pair of clutches 54A and 54B and being disposed between the gears 38 and 50; while the clutch means 56 comprises a pair of clutches 56A and 56B and is disposed between the gears 40 and 52. The clutches 54A and 54B are operative to alternately engage the gears 38 and 50 to the clutch shaft 34 so that the latter is rotated in a forward or reverse direction and the clutches 56A and 56B are operative to alternately engage the gears 40 and 52 to the clutch shaft 36 so that the latter is rotated in a forward or reverse direction.

The forward end of the clutch shafts 34 and 36 have mounted thereon for unitary rotation bevel pinion gears 58 and 60 respectively. A pair of aligned and opposed transversely extending output shafts 62 and 64 are rotatably mounted in the case 12 by means of bearings 66 and 68 respectively; the shaft 62 having a bevel gear 70 mounted on the inboard end thereof for unitary rotation therewith and constantly in mesh with the bevel pinion 58, and the shaft 64 having a bevel gear 72 mounted on the inboard end thereof unitarily rotatable therewith and constantly in mesh with the bevel pinion 60. Accordingly, when the clutch shafts 34 and 36 are in a counterrotating relationship (rotating oppositely) the output shafts will be rotated in the same direction.

The clutch shafts 34 and 36 project rearwardly from the case 12 and each is provided with manually controlled brake 74, the brake 74 normally being disengaged and operable under the control of the operator for holding the clutch shafts 34 and 36 (and through the same) the output shafts 62 and 64 against rotation. The brakes 74 are independently controlled so that each clutch shaft 34 or 36 can be held against rotation independently of the other. The construction of the brakes 74 is conventional and may be of the type now conventionally employed in transmissions of this type.

Figure 4:
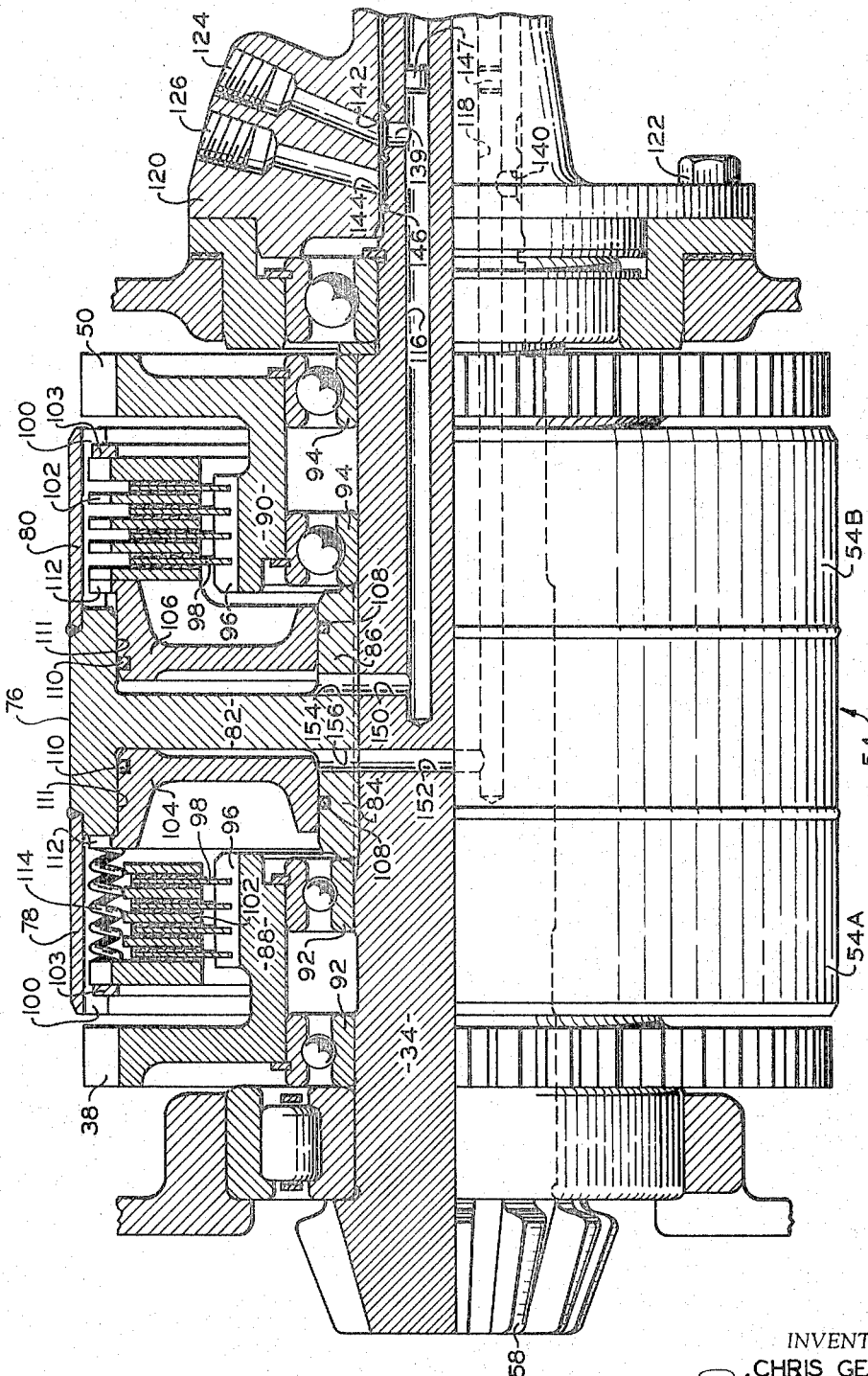
FIG. 4 is an enlarged fragmentary sectional view of one of the hydraulic pressure actuated multiple disk clutches utilized therein.

Referring to FIG. 4 wherein the clutch means 54 is shown in greater detail, the clutch means 54, as well as the clutch means 28 on the shaft 16 and the clutch means 56 on the shaft 36, is a double, multiple disk, hydraulic pressure actuated clutch. The clutch means includes an annular drum 76 made of a plurality of sections integrally joined as by welding, and comprises forward and rear portions 78 and 80 connected to a central rib portion 82 which extends radially inwardly from the drum, is splined to the clutch shaft 34, and has forwardly and rearwardly extending hubs 84 and 86. The gears 38 and 50 have annular hubs 88 and 90 respectively which project axially inwardly of the drum 76 and are spaced radially inwardly from the same. A pair of bearings 92 are interposed between the gear 38 and the shaft 34 and a pair of bearings 94 interposed between the gear 50 and the shaft 34 so that the gears 38 and 50 are freely rotatable on the shaft 34.

The hubs 88 and 90 are provided with peripheral splines 96, upon which are received a plurality of annular disks 98 having internally splined bores so that the disks 98 and gears rotate unitarily while the disks are axially slideable thereon. The forward and rear portions 78 and 80 of the drum 76 are each provided with internal splines 100 which splines receive the peripheral splines of a plurality of friction disks 102 which are interleaved with the friction disks 98 so that the disks 102 and drum 76 rotate unitarily while the disks are axially movable relative thereto. A snap ring 103 is carried at the outer end of the splines 100 of each of the portions 78 and 80 and is adapted to have the adjacent friction disk 102 pressed thereagainst.

A pair of pistons in the form of pressure plates 104 and 106 are slideably carried by the hubs 84 and 86 respectively; the hubs each having suitable sealing means 108 on the periphery thereof slidingly engaging the bore of the pressure plate carried thereby. Each pressure plate 104 and 106 has a sealing means 110 in the periphery thereof which forms a sliding seal with the axially inner unsplined portion of the internal surface 111 of the drum 76, and each has a peripheral splined portion 112 which registers with the adjacent splines of the forward and and rear portions 78 and 80 so that the pressure plates are mounted for unitary rotation with the drum while being axially movable relative thereto toward and away from the innerleaved friction plates 98 and 102.

Spring means, one of which is shown at 114, are provided to bias the pressure plates 106 and 108 toward the rib 82. More particularly, the splines 100 and friction disks 102, with the exception of the axially outermost disk 102, of each portion 78 and 80 are relieved at circumferentially spaced intervals and a coil spring 114 is disposed in each relieved area and engages the pressure plates 104 and 106 and the axially outermost friction disks 102 thereby pressing the pressure plates axially inwardly.

Figure 5:
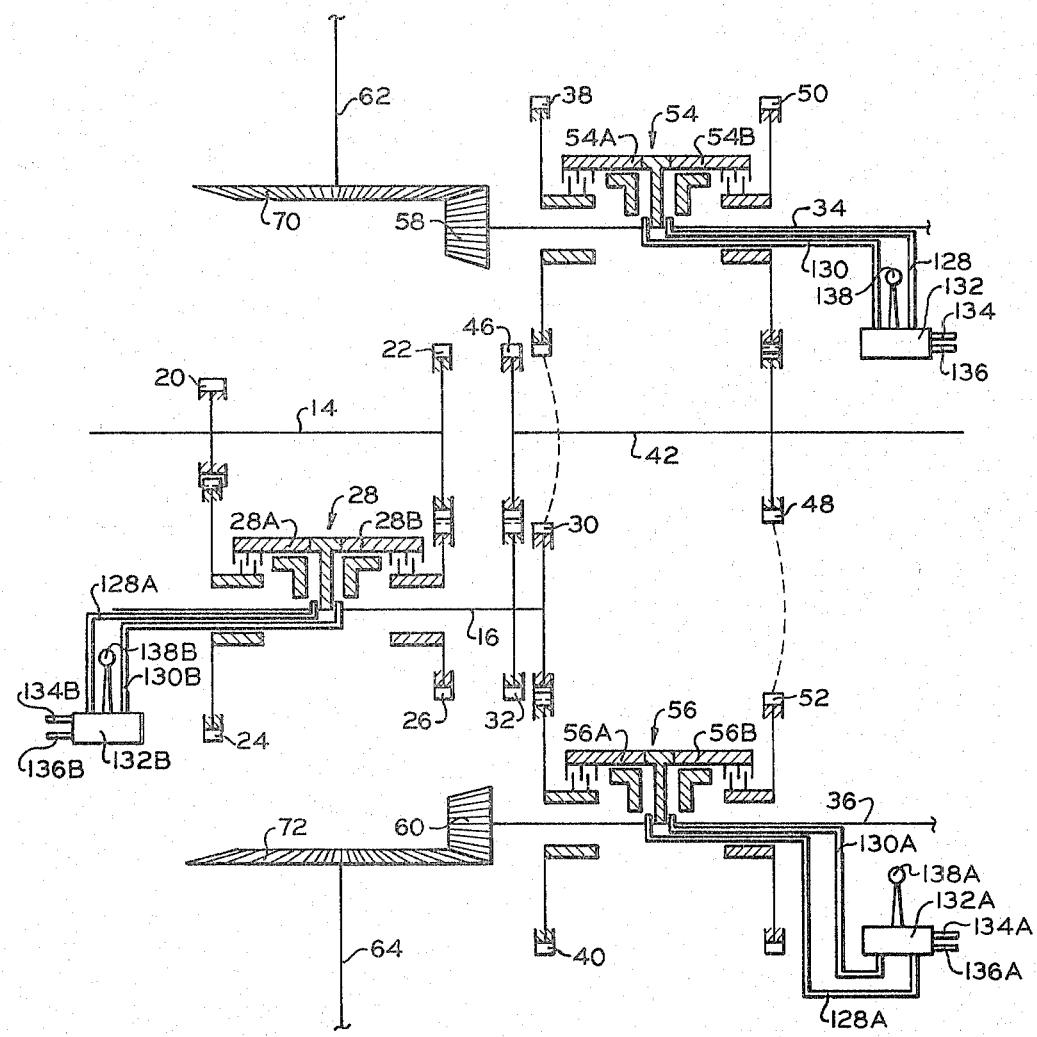
FIG. 5 is a diagrammatic view of the power train of the transmission of FIG. 1 including a diagrammatic showing of a control system therefor.

Means is provided for individually urging the pressure plates 104 and 106 axially outwardly into a pressing relationship with the adjacent friction plates 102 and thereby pressing the friction plates 98 and 102 into frictional engagement. More particularly, the clutch shaft 34 is provided with a pair of openings 116 and 118 which extend axially into the same from the rear end thereof. A bearing cap 120 is secured to the case 12 by a plurality of bolts, one of which is shown at 122, and surrounds the portion of the shaft 34 emerging from the case. A pair of control fluid passages 124 and 126 are provided in the cap 120, the outer end thereof being threaded, and fluid bearing lines 128 and 130, shown in FIG. 5, are respectively threadedly connected thereto. Lines 128 and 130 extend to a three position control valve 132 having a vent line 134, a supply line 136 supplying the same with pressurized hydraulic fluid, and a control handle 138.

When the handle 138 is centralized as shown, both lines 128 and 130 are vented through the line 134; when the handle is moved fully clockwise the line 128 is charged with pressure fluid and the line 130 remains vented; and when the handle is moved counterclockwise the line 128 becomes vented while the line 130 is charged with pressure fluid.

The shaft 34 is provided with a pair of radial openings 139 and 140, the opening 139 extending from the axial opening 116 to the surface of the shaft 34 at the location of the passage 124, and the opening 140 extending from the axial opening 118 to the surface of the shaft 34 at the location of the passage 126. The shaft 34 is provided with peripheral grooves 142 and 144 at the location of the openings 139 and 140 so that the passages 116 and 118 are always confluent with the openings 139 and 140 respectively. Suitable sealing means 146 are provided between the openings 139 and 140 and axially outwardly of the same to inhibit undesired flow of pressure fluid past the same, and a plug 147 is provided in each of the axial openings 116 and 118 to the rear of the position of the openings 139 and 140 so that the rear end of the openings 116 and 118 are sealed.

The axial openings 116 and 118 extend forwardly in the shaft 34 and a pair of radially extending openings 150 and 152 extend respectively therefrom to the surface of the shaft. A passage 154 is formed in the hub 86 of the rib 82 and disposed in a confluent relationship with the opening 150, and a passageway 156 is formed in the hub 84 and in a confluent relationship with the opening 152. The opening 154 extends through the hub 86 and opens at a location between the rib 82 and the pressure plate 106, while the opening 156 extends through the hub 84 and opens at a location between the rib 82 and the pressure plate 104. Accordingly, when the handle 138 is centralized, the areas between the rib 82 and both pressure plates 104 and 106 are vented and the springs 114 bias the pressure plates toward the rib 82 so that the clutches 54A and 54B are both disengaged. When the handle 138 of the valve 132 is moved fully clockwise, fluid enters the chamber between the rib 82 and the pressure plate 106 and the clutch 54B becomes engaged and the gear 50 becomes drivingly connected to the shaft 34. When the handle 138 is moved fully counterclockwise, fluid enters the chamber between the rib 82 and the pressure plate 104 and the clutch 54A becomes engaged and the gear 38 becomes drivingly connected to the shaft 34 while the chamber between the pressure plate 106 and the rib 82 becomes vented so that the clutch 54B is disengaged. It is, therefore, apparent that the clutches 54A and 54B are either both disengaged or alternately engaged, but not simultaneously engaged.

As shown in FIG. 5, the clutch means 56 is provided with a valve 132A having a handle 138A, vent and supply lines 134A and 136A, and lines 128A and 130A which connect the valve with the clutches 56A and 56B respectively, so that when the handle 130A is moved fully clockwise the clutch 56A is engaged and the gear 40 becomes drivingly connected to the shaft 36, and when the handle 138 is moved fully counterclockwise the clutch 56B is engaged and the gear 52 becomes drivingly connected to the clutch 36. Centralization of the handle 138A results in both clutches 56A and 56B being disengaged.

The clutch means 28 is provided with a valve 132B having a handle 138B, vent and supply lines 134B and 136B and lines 128A and 130B which connect the valve with the clutches 28A and 28B respectively. When the handle 138B is moved fully clockwise, the clutch 28B is engaged and the gear 26 becomes drivingly connected to the shaft 16, and when the handle 138B is moved fully counterclockwise, the clutch 28A is engaged and the gear 24 becomes drivingly connected to the shaft 16. When the handle 138B is centralized, both the clutches 28A and 28B are disengaged.

OPERATION

With a suitable prime mover driving the input shaft 14, the operator can condition the transmission 10 for high or low speed operation of the change speed clutch shaft 16 when engaging the clutch 28A for low speed operation or the clutch 28B for high speed operation or the transmission 10 can be neutralized by centralizing the valve 132B so that both clutches 28A and 28B are disengaged. The shaft 16 drives the drive gears 30 and 32 constantly therewith, the drive gear 30 constantly drives the gears 38 and 40 on the clutch shafts 34 and 36 respectively, while the drive gear 32 constantly drives the gear 46 and intermediate shaft 42. The shaft 42 and the gear 48 constantly drive the gears 50 and 52 on the clutch shafts 34 and 36 respectively. Accordingly, if the operator desires the output shaft 62 to be driven in a forward direction by the clutch shaft 34, the clutch 54A is engaged by moving the handle 138 of the valve 128 fully counterclockwise so that the shaft 34 is driven from the shaft 16 by the gears 38 and 30, while if it is desired to drive the output shaft in a reverse direction, the clutch 54B is engaged by moving the handle 138 fully clockwise so that the shaft 34 is driven from the shaft 16 by the gears 50 and 48, the shaft 42 and gears 46 and 32. The output shaft 64 may be conditioned for forward operation by moving the handle 138A of the valve 132A fully counterclockwise so that the clutch 56B is engaged and the shaft 36 is driven from the shaft 16 of the gears 52 and 48, the shaft 42 and the gears 32 and 46, and may be conditioned for reverse operation by moving the handle 138 fully clockwise so that the clutch 56A is engaged and the shaft 36 is driven from the shaft 16 by the gears 30 and 40.

Since the clutches 54 and 56 operate entirely independently of each other, the shafts 62 and 64 may be driven simultaneously in forward, simultaneously in reverse, one in reverse while the other is in forward, or either can be neutralized while the other is driven forward or reverse.

While I have illustrated and described a preferred embodiment of my invention, it is understood that this is capable of modification and I, therefore, do not wish to be limited to the precise details set forth, but desire to avail myself with such changes and alterations as fall within the purview of the following claims.

What is claimed is:

1. A counterrotating transmission comprising a first shaft, a first and a second clutch shaft, an intermediate shaft, a first and a second clutch shaft, an intermediate on said intermediate shaft constantly drivingly connecting said first shaft and said intermediate shaft for simultaneous rotation in opposite directions, second gear means carried by said first shaft and said first and second clutch shafts and including a first and a second clutch means, said second gear means being operative to drive said clutch shafts in the same direction with respect to each other and with respect to said intermediate shaft, said first and second clutch means being independently operable and adapted to selectively couple said first and said second clutch shafts to said first shaft respectively, and third gear means carried by said intermediate shaft and said first and said second clutch shaft and including a third and fourth clutch means, said third gear means including a second gear mounted on said intermediate shaft and axially displaced along said intermediate shaft from said first gear, said third gear means being operative to drive said first and second clutch shafts in the same direction with respect to each other and in the opposite direction with respect to said intermediate shaft, said third and fourth clutch means being independently operable and adapted to selectively couple said first and second clutch shafts to said intermediate shaft respectively.

2. A transmission according to claim 1 wherein said intermediate shaft forms a power take-off shaft and said first and third clutch means are carried by said first clutch shaft and said second and fourth clutch means are carried by said second clutch shaft.

3. A transmission according to claim 1 including a pair of axially aligned laterally extending drive shafts, one connected in a driving relationship with each of said clutch shafts.

4. A counterrotating transmission comprising a first pair of shafts in geared engagement so as to turn in opposite directions, change speed gearing connected to one of said shafts for driving said shafts, a pair of parallel shafts, first gear means carried by one of said first pair of shafts and said parallel shafts and including clutch means, said first gear means being constantly drivingly connected to said one shaft and said clutch means being operative to selectively and individually clutchingly engage said first gear means to said parallel shafts, a second gear means carried by the other of said first pair of shafts and said parallel shafts and including a third and fourth clutching means, said second gear means including a gear mounted on said other of said first pair of shafts and axially displaced from said geared engagement of said first pair of shafts and being constantly drivingly connected to said other shaft and said clutch means being adapted to selectively and individually clutchingly engage said gear means to said parallel shafts.

5. A counterrotating transmission comprising a first and second shaft, first gear means constanty drivingly connecting said shafts for rotation in opposite direction including a first gear mounted on said second shaft, a first and a second parallel clutch shaft, second gear means constantly drivingly connected to said first shaft and operable to be individually and independently connected to said clutch shafts, a first clutch means carried by said first clutch shaft and selectively operable to clutchingly connect said second gear means in a driving relationship thereto, second clutch means carried by said second clutch shaft selectively operable to clutchingly connect said second gear means in a driving relationship thereto, third gear means constantly drivingly connected to said second shaft and including a second gear axially displaced from said first gear and operable to be individually and independently connected to said clutch shafts, third clutch means carried by said first clutch shaft and selectively operable to clutchingly connect said third gear means in a driving relationship thereto, and fourth clutch means carried by said second clutch shaft and selectively operable to clutchingly connect said third gear means in a driving relationship thereto.

6. A counterrotating transmission comprising, a first and a second shaft, an input shaft said input shaft being co-axially aligned with said second shaft, change speed gearing operatively disposed between said input shaft and said first shaft whereby said first shaft is operable to be driven in a selected one of a plurality of speeds, first gear means drivingly connected to said first shaft, a gear drivingly connected to said second shaft and constantly drivingly connected to said first gear means whereby said first and second shafts rotate simultaneously in opposite directions, a first and a second clutch shaft each having a pair of gears rotatably mounted thereon, one of said gears on each of said clutch shafts being constantly drivingly connected to said first gear means, a second gear drivingly connected to said second shaft, the other of said gears on each of said clutch shafts being constantly drivingly connected to said second gear, and clutch means carried by said clutch shafts and cooperable with said gears carried by said clutch shafts and operative to individually drivingly connect the same to said clutch shafts whereby said clutch shafts may be driven simultaneously or individually in the same or opposite directions.

7. A counterrotating transmission comprising in combination, a first and a second longitudinally extending shaft, a longitudinally extending input shaft, said second shaft and said input shaft being axially aligned and displaced longitudinally from each other, change speed gearing operably disposed between said input shaft and said first shaft whereby said first shaft is operable to be driven in one of a plurality of speeds, first gear means drivingly connected to said first shaft, a gear drivingly connected to said second shaft and constantly drivingly connected to said first gear means whereby said first and second shafts rotate simultaneously and in opposite directions, a first and a second parallel clutch shaft each having a pair of gears rotatably mounted thereon, one of said gears on each side of said clutch shafts being constantly drivingly connected to said first gear means, a second gear drivingly connected to said second shaft, the other of said gears on each of said clutch shafts being constantly drivingly connected to said second gear, and separate clutch means associated with each of said gears carried by said clutch shafts and being carried by the clutch shaft carrying said gear, said clutch means being operative to drivingly connect the gear associated therewith to the shaft carrying the same, and means for individually operating said clutch means whereby said clutch shafts may be driven simultaneously or individually in the same or opposite directions.

8. A transmission according to claim 7 including a pair of axially aligned laterally extending drive shafts, one connected in driving relationship with each of said clutch shafts.

9. A transmission according to claim 7 wherein said input shaft and said second shaft are disposed in coaxial alignment with one another and said second shaft forms a power take-off shaft.

10. A counterrotating transmission comprising in combination a first and a second shaft, first gear means drivingly connected to said first shaft, a pair of gears drivingly connected to said second shaft and axially spaced thereon, one of said pair of gears being constantly drivingly connected to said first gear means whereby said first and second shafts rotate in opposite directions, a first and a second clutch shaft each having a first and a second clutch gear rotatably mounted thereon, said first clutch gears on each of said clutch shafts being constantly drivingly connected to said first gear means, said second clutch gears being axially spaced relative to said first clutch gears and being constantly drivingly connected to said second gear on said second shaft, a first and a second double clutch means carried by said first and second clutch shafts respectively, said first clutch means being operatively connected to said first and second gears on said first clutch shaft and operative to alternately drivingly connect the same to said first clutch shaft, said second clutch means being operatively connected to said first and second gears on said second clutch shaft and operative to alternately drivingly connect the same into said second clutch shaft.

11. A counterrotating transmission according to claim 10 wherein said first and said second double clutch means are disposed intermediate said first and second gears on said first and said second clutch shafts respectively.

12. A counterrotating transmission according to claim 10 including a pair of axially aligned laterally extending drive shafts, one connected in a driving relationship with each of said clutch shafts.

13. A counterrotating transmission comprising a first shaft, a first and a second parallel shaft, an intermediate shaft, first gear means including a first gear mounted on said intermediate shaft constantly drivingly connected to said first shaft and said intermediate shaft for simultaneous rotation in opposite directions, second gear means carried by said first shaft and said first and second parallel shafts and including a first and a second connecting means, said first and second connecting means being independently operable and adapted to selectively connect said second gear means in a driving relationship between said first and second parallel shafts and said first shaft respectively, and a third gear means including a second gear mounted on said intermediate shaft in axially spaced relation relative to said first gear, said third gear means carried by said intermediate shaft and said first and second parallel shafts and including a third and a fourth connecting means, said third and fourth connecting means being independently operable and adapted to selectively connect said third gear means in a driving relationship between said first and second parallel shafts and said intermediate shaft respectively.

References Cited by the Examiner

UNITED STATES PATENTS

| | | | |
|---|---|---|---|
| 1,240,423 | 9/1917 | Cole | 74—655 |
| 2,375,592 | 5/1945 | Sinclair | 74—665 X |
| 2,953,941 | 9/1960 | Schwartz et al. | 74—665 |
| 3,017,941 | 1/1962 | Baker | 74—665 X |

FOREIGN PATENTS 1,129,028   5/1962   Germany.

DAVID J. WILLIAMOWSKY, *Primary Examiner.*

J. R. BENEFIEL, *Assistant Examiner.*